(12) United States Patent
Huang

(10) Patent No.: US 11,165,372 B2
(45) Date of Patent: Nov. 2, 2021

(54) METHOD AND APPARATUS TO CHARACTERIZE LOADS IN A LINEAR SYNCHRONOUS MOTOR SYSTEM

(71) Applicant: MagneMotion, Inc., Devens, MA (US)

(72) Inventor: Yuhong Huang, Acton, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 325 days.

(21) Appl. No.: 15/702,983

(22) Filed: Sep. 13, 2017

(65) Prior Publication Data
US 2019/0078950 A1    Mar. 14, 2019

(51) Int. Cl.
| | |
|---|---|
| *H02P 6/00* | (2016.01) |
| *H02P 6/18* | (2016.01) |
| *H02P 25/064* | (2016.01) |
| *H02P 25/06* | (2016.01) |
| *B65G 54/02* | (2006.01) |
| *B60L 15/00* | (2006.01) |

(Continued)

(52) U.S. Cl.
CPC .............. *H02P 6/006* (2013.01); *B60L 13/03* (2013.01); *B60L 15/005* (2013.01); *B65G 54/02* (2013.01); *H02P 6/183* (2013.01); *H02P 25/06* (2013.01); *H02P 25/064* (2016.02); *G01L 5/0028* (2013.01)

(58) Field of Classification Search
None
See application file for complete search history.

(56) References Cited

U.S. PATENT DOCUMENTS 3,641,939 A * 2/1972 Remy ................... B60L 15/005
                                                        104/293
3,850,109 A * 11/1974 Thornton ................ B60L 13/10
                                                        104/285

(Continued)

FOREIGN PATENT DOCUMENTS

| CN | 104444078 A * | 3/2015 | |
| DE | 19524485 A1 * | 1/1997 | ............. B65G 54/02 |

(Continued)

OTHER PUBLICATIONS

Extended European Search Report dated Jan. 24, 2019—(10) pages.

*Primary Examiner* — Catherine T. Rastovski
*Assistant Examiner* — Leonard S Liang
(74) *Attorney, Agent, or Firm* — Boyle Fredrickson, SC

(57) ABSTRACT

A method and system for characterizing performance of a mover operating in a linear drive system is disclosed, where the linear drive system includes multiple track segments and where each track segment includes a segment controller. Each segment controller is configured to obtain an in-system frequency response for a mover present along the track segment. An injection sequence is generated within the segment controller, where the injection sequence includes harmonic content across a range of frequencies to be evaluated. The injection sequence is added to a control module within the segment controller, and the segment controller samples and records motion of the mover in response to the injection sequence. A frequency response corresponding to the recorded motion of the mover resulting from the injection sequence is obtained, and may be utilized to identify a resonant operating point or an undesirable level of the harmonic content present in the sampled data.

20 Claims, 9 Drawing Sheets

(51) Int. Cl.
*B60L 13/03* (2006.01)
*G01L 5/00* (2006.01)

(56) References Cited

U.S. PATENT DOCUMENTS

| | | | | |
|---|---|---|---|---|
| 4,704,568 A * | 11/1987 | Beck | H02K 41/025 | 318/135 |
| 4,718,539 A * | 1/1988 | Fukuwatari | B65G 51/03 | 104/292 |
| 4,841,869 A * | 6/1989 | Takeuchi | B60L 13/04 | 104/140 |
| 4,853,602 A * | 8/1989 | Hommes | B60L 15/005 | 318/38 |
| 4,988,273 A * | 1/1991 | Faig | B29C 45/5008 | 425/145 |
| 5,086,729 A * | 2/1992 | Katagiri | B29C 51/261 | 118/50 |
| 5,501,317 A * | 3/1996 | Sommer | B65G 54/02 | 198/464.2 |
| 5,565,752 A * | 10/1996 | Jansen | H02K 17/165 | 310/169 |
| 5,821,713 A * | 10/1998 | Rolling | H02P 6/18 | 318/400.32 |
| 5,904,101 A * | 5/1999 | Kuznetsov | B60L 13/10 | 104/130.02 |
| 6,101,952 A * | 8/2000 | Thornton | B60L 13/003 | 104/130.02 |
| 6,148,784 A * | 11/2000 | Masberg | B60W 20/15 | 123/192.1 |
| 6,279,728 B1 * | 8/2001 | Jung | B61B 13/08 | 198/619 |
| 6,315,108 B1 * | 11/2001 | Bootsman | B65B 5/106 | 198/619 |
| 6,611,138 B2 * | 8/2003 | Vasiloiu | G01D 5/2046 | 324/207.12 |
| 6,621,183 B1 * | 9/2003 | Boys | H02J 5/005 | 307/145 |
| 6,782,296 B2 * | 8/2004 | Hoche | G05B 13/042 | 359/223.1 |
| 6,876,107 B2 * | 4/2005 | Jacobs | H02K 11/215 | 310/12.19 |
| 6,895,352 B2 * | 5/2005 | Josselson | G05B 17/02 | 702/108 |
| 7,170,241 B1 * | 1/2007 | Faizullabhoy | H02P 25/06 | 318/135 |
| 7,170,251 B2 | 1/2007 | Huang | | |
| 7,190,144 B2 | 3/2007 | Huang | | |
| 7,291,999 B2 | 11/2007 | Huang | | |
| 7,385,363 B2 * | 6/2008 | Schemm | H02K 41/031 | 318/135 |
| 7,448,327 B2 | 11/2008 | Thornton et al. | | |
| 7,969,103 B2 * | 6/2011 | Sepe, Jr. | H02P 6/006 | 318/135 |
| 8,863,669 B2 | 10/2014 | Young et al. | | |
| 9,346,371 B2 | 5/2016 | King et al. | | |
| 10,164,555 B1 * | 12/2018 | Ozimek | H02P 7/025 | |
| 10,177,640 B2 * | 1/2019 | Achterberg | H01H 1/50 | |
| 10,381,958 B2 * | 8/2019 | Das | H02K 41/02 | |
| 2002/0022903 A1 * | 2/2002 | Krah | G05B 13/024 | 700/170 |
| 2002/0117378 A1 * | 8/2002 | Buchi | B65G 23/18 | 198/619 |
| 2003/0193306 A1 * | 10/2003 | Griffitts | H02P 6/18 | 318/459 |
| 2004/0135534 A1 * | 7/2004 | Cullen | G05B 17/02 | 318/609 |
| 2005/0162174 A1 * | 7/2005 | Huang | G05B 13/042 | 324/520 |
| 2005/0174124 A1 * | 8/2005 | Huang | B41M 5/26 | 324/520 |
| 2005/0225188 A1 * | 10/2005 | Griepentrog | H01F 38/18 | 310/112 |
| 2006/0001518 A1 * | 1/2006 | Hayashi | G01D 5/2046 | 336/200 |
| 2006/0081446 A1 * | 4/2006 | Lee | B65G 23/23 | 198/805 |
| 2008/0006172 A1 | 1/2008 | Thornton | | |
| 2008/0115372 A1 * | 5/2008 | Vogel | G01D 5/485 | 33/1 Q |
| 2009/0039810 A1 * | 2/2009 | Gotz | H02P 6/185 | 318/400.32 |
| 2009/0224717 A1 * | 9/2009 | Sawaragi | G05B 5/01 | 318/610 |
| 2010/0084247 A1 * | 4/2010 | Wipf | B65G 19/02 | 198/617 |
| 2011/0156619 A1 * | 6/2011 | Nomura | H02P 25/06 | 318/135 |
| 2011/0199031 A1 * | 8/2011 | Balazovic | H02P 21/18 | 318/400.33 |
| 2013/0074724 A1 * | 3/2013 | King | B60L 13/003 | 104/130.02 |
| 2014/0257554 A1 * | 9/2014 | Takagi | H02K 11/21 | 700/229 |
| 2014/0312884 A1 * | 10/2014 | Reilio | B66B 1/3492 | 324/207.11 |
| 2014/0327380 A1 * | 11/2014 | Magee | H02P 6/185 | 318/400.32 |
| 2015/0048817 A1 * | 2/2015 | Prussmeier | G01D 5/22 | 324/207.17 |
| 2015/0360581 A1 | 12/2015 | King et al. | | |
| 2016/0144404 A1 * | 5/2016 | Houston | B06B 1/166 | 318/114 |
| 2016/0159585 A1 * | 6/2016 | Wernersbach | B65G 54/02 | 198/617 |
| 2016/0167899 A1 * | 6/2016 | Prinz | G01N 35/02 | 198/339.1 |
| 2016/0207719 A1 * | 7/2016 | Josefowitz | B60L 13/003 | |
| 2017/0217460 A1 * | 8/2017 | Huber | B61L 25/021 | |
| 2017/0346379 A1 * | 11/2017 | Weber | H02K 11/30 | |
| 2017/0346380 A1 * | 11/2017 | Weber | B60L 13/10 | |
| 2018/0086565 A1 * | 3/2018 | Grosskreuz | B65G 54/02 | |
| 2018/0276436 A1 * | 9/2018 | Sun | B07C 5/36 | |
| 2018/0284735 A1 * | 10/2018 | Celia | G05B 23/024 | |
| 2019/0047794 A1 * | 2/2019 | Ozimek | B65G 43/10 | |
| 2019/0058432 A1 * | 2/2019 | Plainer | H02P 25/064 | |
| 2019/0068101 A1 * | 2/2019 | Sun | H02P 25/064 | |
| 2020/0003257 A1 * | 1/2020 | Neufeld | H02K 41/031 | |
| 2020/0031594 A1 * | 1/2020 | Ragan | B65G 35/06 | |

FOREIGN PATENT DOCUMENTS

| | | | | |
|---|---|---|---|---|
| EP | 0388626 A1 * | 9/1990 | | B03C 1/247 |
| EP | 0700844 A2 * | 3/1996 | | B61B 13/08 |
| EP | 0811567 A2 * | 12/1997 | | B61B 13/08 |
| EP | 1180733 A1 | 2/2002 | | |
| EP | 2243730 A1 * | 10/2010 | | B23Q 11/0064 |
| EP | 2538547 A1 | 12/2012 | | |

* cited by examiner

METHOD AND APPARATUS TO CHARACTERIZE LOADS IN A LINEAR SYNCHRONOUS MOTOR SYSTEM

BACKGROUND INFORMATION

The present invention relates to motion control systems and, more specifically, to characterizing loads in a linear drive system for a motion control system, where the motion control system incorporates multiple movers propelled along a track using the linear drive system.

Motion control systems utilizing movers and linear motors can be used in a wide variety of processes (e.g. packaging, manufacturing, and machining) and can provide an advantage over conventional conveyor belt systems with enhanced flexibility, extremely high-speed movement, and mechanical simplicity. The motion control system includes a set of independently controlled "movers" each supported on a track for motion along the track. The track is made up of a number of track segments that, in turn, hold individually controllable electric coils. Successive activation of the coils establishes a moving electromagnetic field that interacts with the movers and causes the mover to travel along the track. Sensors may be spaced at fixed positions along the track and/or on the movers to provide information about the position and speed of the movers.

Each of the movers may be independently moved and positioned along the track in response to the moving electromagnetic field generated by the coils. In a typical system, the track forms a closed path over which each mover repeatedly travels. At certain positions along the track other actuators may interact with each mover. For example, the mover may be stopped at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then completes a cycle along the closed path by returning to the loading station to receive another unit of the product.

Performance of a mover along the track may be impacted by a number of factors. For example, friction between contacting surfaces of the mover and the track may reduce performance. The center of gravity of a mover with respect to the track may limit a rate at which the speed of the mover may be changed. The center of gravity may change as a work piece is loaded and unloaded. Further, performance of a mover may vary at different segments of the track and performance may vary over time.

Thus, it would be desirable to provide a system to characterize performance of a mover operating in a linear drive system.

BRIEF DESCRIPTION

The subject matter disclosed herein describes a method and system for characterizing performance of a mover operating in a linear drive system. The linear drive system includes multiple track segments where each track segment includes a segment controller. Each segment controller is configured to obtain an in-system frequency response for a mover present along the track segment. An injection sequence is generated within the segment controller, where the injection sequence is a pseudo random signal generated such that it exhibits behavior of a random signal and also includes harmonic content across a range of frequencies to be evaluated. According to one embodiment of the invention, the injection sequence is a pseudorandom binary sequence (PRBS). The injection sequence is added to a control module within the segment controller where the control module is operative to control motion of the mover present along the track segment. The segment controller samples and records motion of the mover in response to the injection sequence. A frequency response corresponding to the recorded motion of the mover resulting from the injection sequence is obtained. The frequency response may be utilized to identify a resonant operating point or to determine if the harmonic content in the sampled data exceeds a predefined maximum threshold for operation of the mover.

In one embodiment of the invention, a system for characterizing loads in a linear drive system includes multiple movers, a track, and a processor. Each of the movers includes a load mounted to the mover, and at least one drive magnet mounted to the mover. The track includes multiple track segments defining a closed path along which each of the movers travels. Each of the track segments includes multiple drive coils spaced along the track segment and a memory device. The processor is operative to execute a control module which generates an output current for each of the plurality of drive coils to obtain a desired motion of each of the plurality of movers along the track segment and to generate an injection sequence having a plurality of harmonic components. The processor adds the injection sequence into the control module while commanding each of the plurality of movers to remain at a present location along the track segment, and stores samples of at least one position feedback signal in the memory device. Each position feedback signal corresponds to motion of one of the movers positioned along the track segment while the injection sequence is added into the control module. A frequency response of each mover positioned along the track segment is generated as a function of the injection sequence and of the sampled position feedback signal.

According to another embodiment of the invention, a method for characterizing a load in a linear drive system is disclosed. The linear drive system includes multiple movers operative to travel along a track, and the track includes multiple track segments. A control module is executed in a segment controller to generate an output current for each coil spaced along a track segment. The segment controller generates an injection sequence which includes multiple harmonic components and inserts the injection sequence into the control module while commanding each of the movers to remain at a present location along the track segment. Multiple samples of at least one position feedback signal are stored in a memory device in the segment controller, and each position feedback signal corresponds to motion of one of the movers positioned along the track segment while the injection sequence is added into the control loop. A frequency response is generated for each mover positioned along the track segment as a function of the injection sequence and of the sampled position feedback signal.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
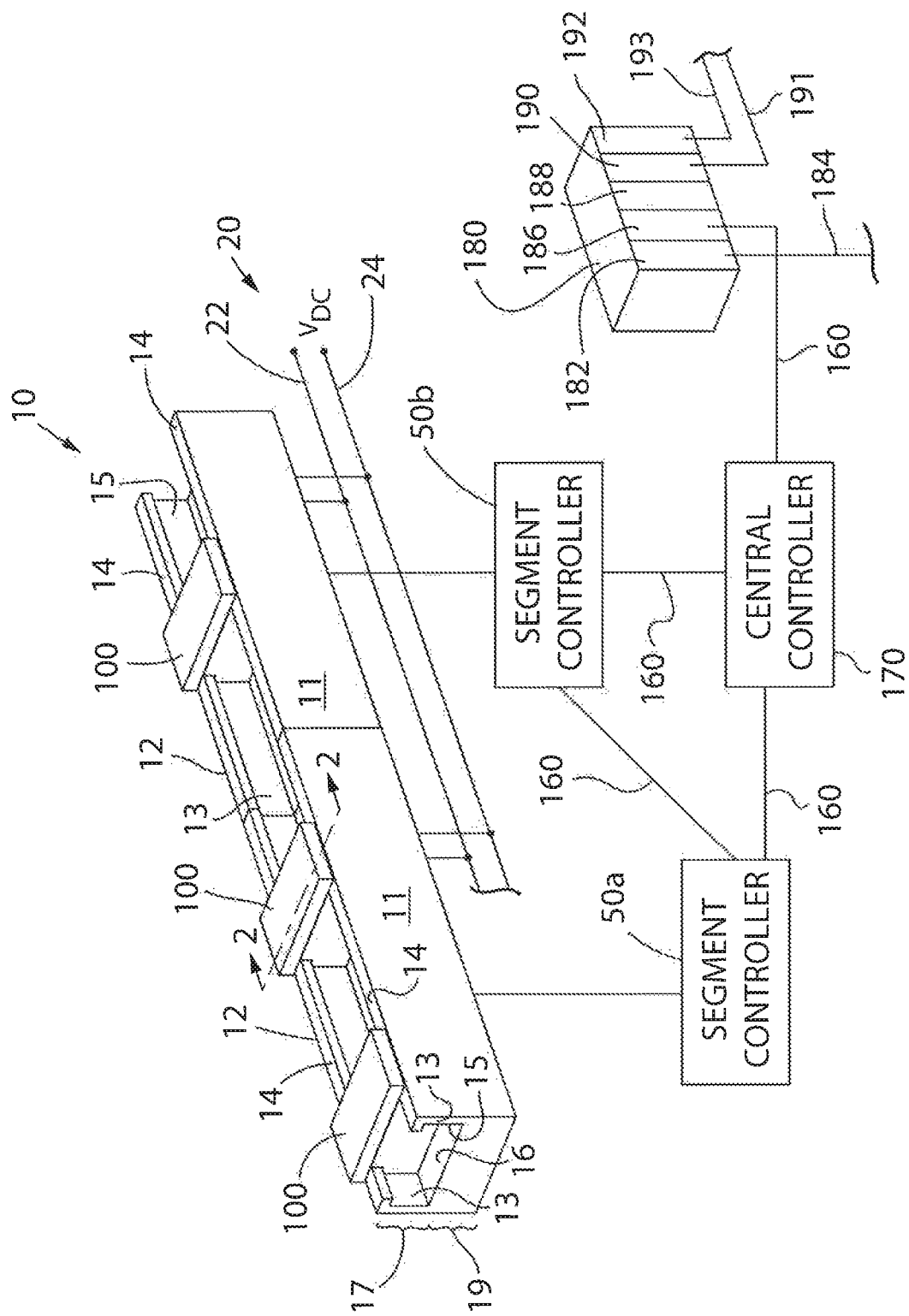
FIG. 1 is a schematic representation of an exemplary control system for a linear drive system according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Turning initially to FIGS. 1-4, an exemplary transport system for moving articles or products includes a track 10 made up of multiple segments 12. According to the illustrated embodiment, multiple segments 12 are joined end-to-end to define the overall track configuration. The illustrated segments 12 are both straight segments having generally the same length, it is understood that track segments of various sizes, lengths, and shapes may be connected together to form the track 10 without deviating from the scope of the invention. Track segments 12 may be joined to form a generally closed loop supporting a set of movers 100 movable along the track 10. The track 10 is illustrated in a horizontal plane. For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes and various combinations thereof. The width of the track 10 may be greater in either the horizontal or vertical direction according to application requirements. The movers 100 will travel along the track and take various orientations according to the configuration of the track 10 and the relationships discussed herein may vary accordingly.

According to the illustrated embodiment, each track segment 12 includes an upper portion 17 and a lower portion 19. The upper portion 17 is configured to carry the movers 100 and the lower portion 19 is configured to house the control elements. As illustrated, the upper portion 17 includes a generally u-shaped channel 15 extending longitudinally along the upper portion 17 of each segment. The channel 15 includes a bottom surface 16 and a pair of side walls 13, where each side wall 13 includes a rail 14 extending along an upper edge of the side wall 13. The bottom surface 16, side walls 13, and rails 14 extend longitudinally along the track segment 12 and define a guideway along which the movers 100 travel. According to one embodiment, the surfaces of the channel 15 (i.e., the bottom surface 16, side walls 13 and rails 14) are planar surfaces made of a low friction material along which movers 100 may slide. The contacting surfaces of the movers 100 may also be planar and made of a low friction material. It is contemplated that the surface may be, for example, nylon, Teflon®, aluminum, stainless steel and the like. Optionally, the hardness of the surfaces on the track segment 12 are greater than the contacting surface of the movers 100 such that the contacting surfaces of the movers 100 wear faster than the surface of the track segment 12. It is further contemplated that the contacting surfaces of the movers 100 may be removably mounted to the housing 11 of the mover 100 such that they may be replaced if the wear exceeds a predefined amount. According to still other embodiments, the movers 100 may include low-friction rollers to engage the surfaces of the track segment 12. Optionally, the surfaces of the channel 15 may include different cross-sectional forms with the mover 100 including complementary sectional forms. Various other combinations of shapes and construction of the track segment 12 and mover 100 may be utilized without deviating from the scope of the invention.

According to the illustrated embodiment, each mover 100 is configured to slide along the channel 15 as it is propelled by a linear drive system. The mover 100 includes a body 102 configured to fit within the channel 15. The body 102 includes a lower surface 106, configured to engage the bottom surface 16 of the channel, and side surfaces 108 configured to engage the side walls 13 of the channel. The mover 100 further includes a shoulder 105 extending inward from each of the side surfaces 108. The shoulder 105 has a width equal to or greater than the width of the rail 14 protruding into the channel. A neck of the mover then extends upward to a top surface 104 of the body 102. The neck extends for the thickness of the rails such that the top surface 104 of the body 102 is generally parallel with the upper surface 32 of each rail 14. The mover 100 further includes a platform 110 secured to the top surface 104 of the body 102. According to the illustrated embodiment, the platform 110 is generally square and the width of the platform 110 is greater than the width between the rails 14. The lower surface 114 of the platform 110, an outer surface of the neck, and an upper surface of the shoulder 105 define a channel 115 in which the rail 14 runs. The channel 115 serves as a guide to direct the mover 100 along the track. It is contemplated that platforms or attachments of various shapes may be secured to the top surface 104 of the body 102. Further, various workpieces, clips, fixtures, and the like may be mounted on the top 112 of each platform 110 for engagement with a product to be carried along the track by the mover 100. The platform 110 and any workpiece, clip, fixture, or other attachment present on the platform may define, at least in part, a load present on the mover 100.

Figure 3:
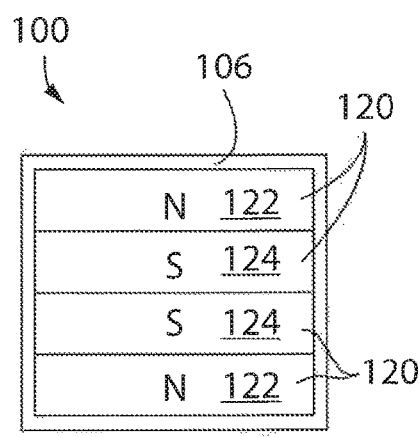
FIG. 3 is a bottom plan view of the exemplary mover of FIG. 2.
Figure 4:
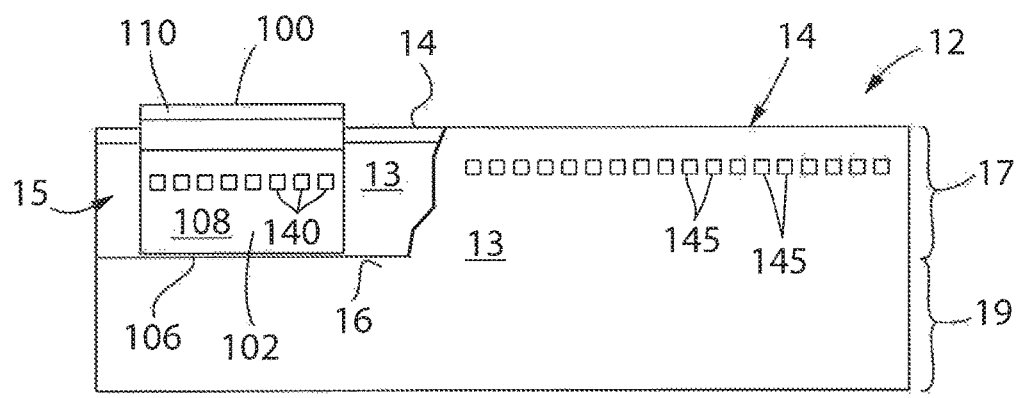
FIG. 4 is a partial side cutaway view of the mover and track segment of FIG. 2.

The mover 100 is carried along the track 10 by a linear drive system. The linear drive system is incorporated in part on each mover 100 and in part within each track segment 12. One or more drive magnets 120 are mounted to each mover 100. With reference to FIG. 3, the drive magnets 120 are arranged in a block on the lower surface of each mover. The drive magnets 120 include positive magnet segments 122, having a north pole, N, facing outward from the mover and negative magnet segments 124, having a south pole, S, facing outward from the mover. According to the illustrated embodiment, two positive magnet segments 122 are located on the outer sides of the set of magnets and two negative magnet segments 124 are located between the two positive magnet segments 122. Optionally, the positive and negative motor segments may be placed in an alternating configuration. In still other embodiments, a single negative magnet segment 124 may be located between the positive magnet segments 122. Various other configurations of the drive magnets 120 may be utilized without deviating from the scope of the invention.

Figure 5:
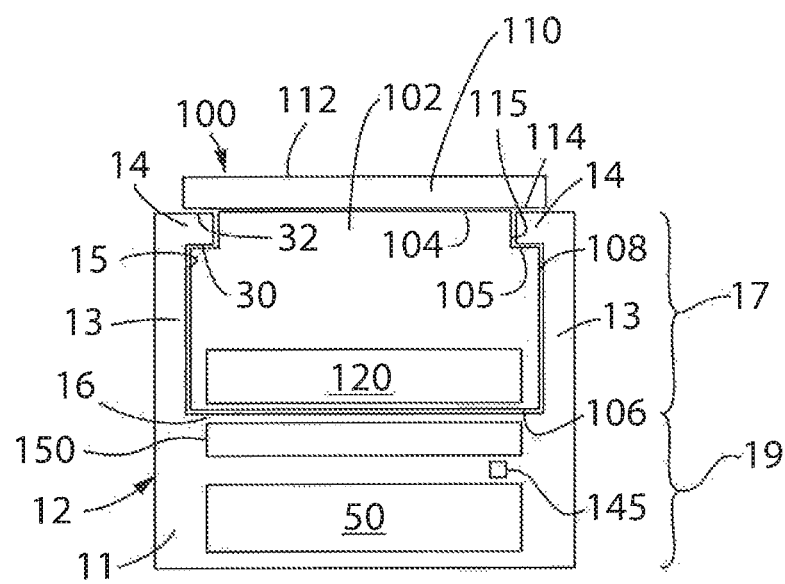
FIG. 5 is a sectional view of another embodiment of a mover and track segment included in the linear drive system taken at 2-2 of FIG. 1.

The linear drive system further includes a series of coils 150 spaced along the length of the track segment 12. With reference also to FIG. 5, the coils 150 may be positioned within a housing 11 for the track segment 12 and below the bottom surface 16 of the channel 15. The coils 150 are energized sequentially according to the configuration of the drive magnets 120 present on the movers 100. The sequential energization of the coils 150 generates a moving electromagnetic field that interacts with the magnetic field of the drive magnets 120 to propel each mover 100 along the track segment 12.

Figure 2:
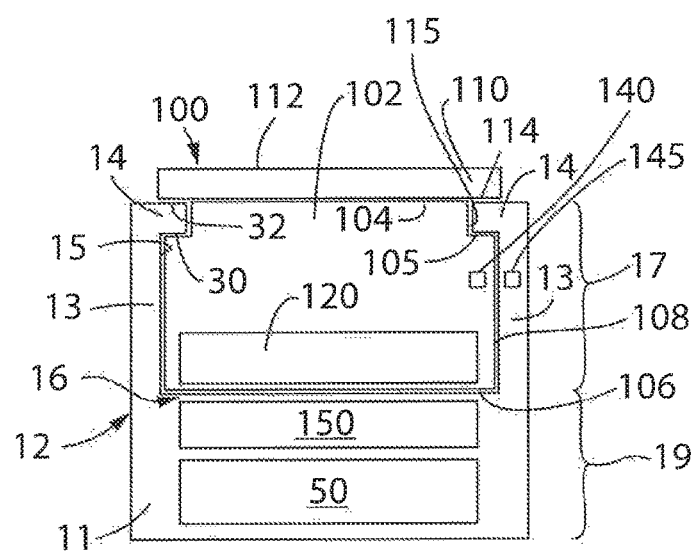
FIG. 2 is a sectional view of one embodiment of a mover and track segment included in the linear drive system taken at 2-2 of FIG. 1.

A segment controller 50 is provided within each track segment 12 to control the linear drive system and to achieve the desired motion of each mover 100 along the track segment 12. Although illustrated in FIG. 1 as blocks external to the track segments 12, the arrangement is to facilitate illustration of interconnects between controllers. As shown in FIG. 2, it is contemplated that each segment controller 50 may be mounted in the lower portion 19 of the track segment 12. A first segment controller 50a is shown with a first track segment, and a second segment controller 50b is shown with a second track segment. It is contemplated that any number "n" of segment controllers 50n (see FIG. 8) may be included in the linear drive system. Each segment controller 50 is in communication with a central controller 170 which is, in turn, in communication with an industrial controller 180. The industrial controller may be, for example, a programmable logic controller (PLC) configured to control elements of a process line stationed along the track 10. The process line may be configured, for example, to fill and label boxes, bottles, or other containers loaded onto or held by the movers 100 as they travel along the line. In other embodiments, robotic assembly stations may perform various assembly and/or machining tasks on workpieces carried along by the movers 100. The exemplary industrial controller 180 includes: a power supply 182 with a power cable 184 connected, for example, to a utility power supply; a communication module 186 connected by a network medium 160 to the central controller 170; a processor module 188; an input module 190 receiving input signals 191 from sensors or other devices along the process line; and an output module 192 transmitting control signals 193 to controlled devices, actuators, and the like along the process line. The processor module 188 may identify when a mover 100 is required at a particular location and may monitor sensors, such as proximity sensors, position switches, or the like to verify that the mover 100 is at a desired location. The processor module 188 transmits the desired locations of each mover 100 to a central controller 170 where the central controller 170 operates to generate commands for each segment controller 50.

Figure 8:
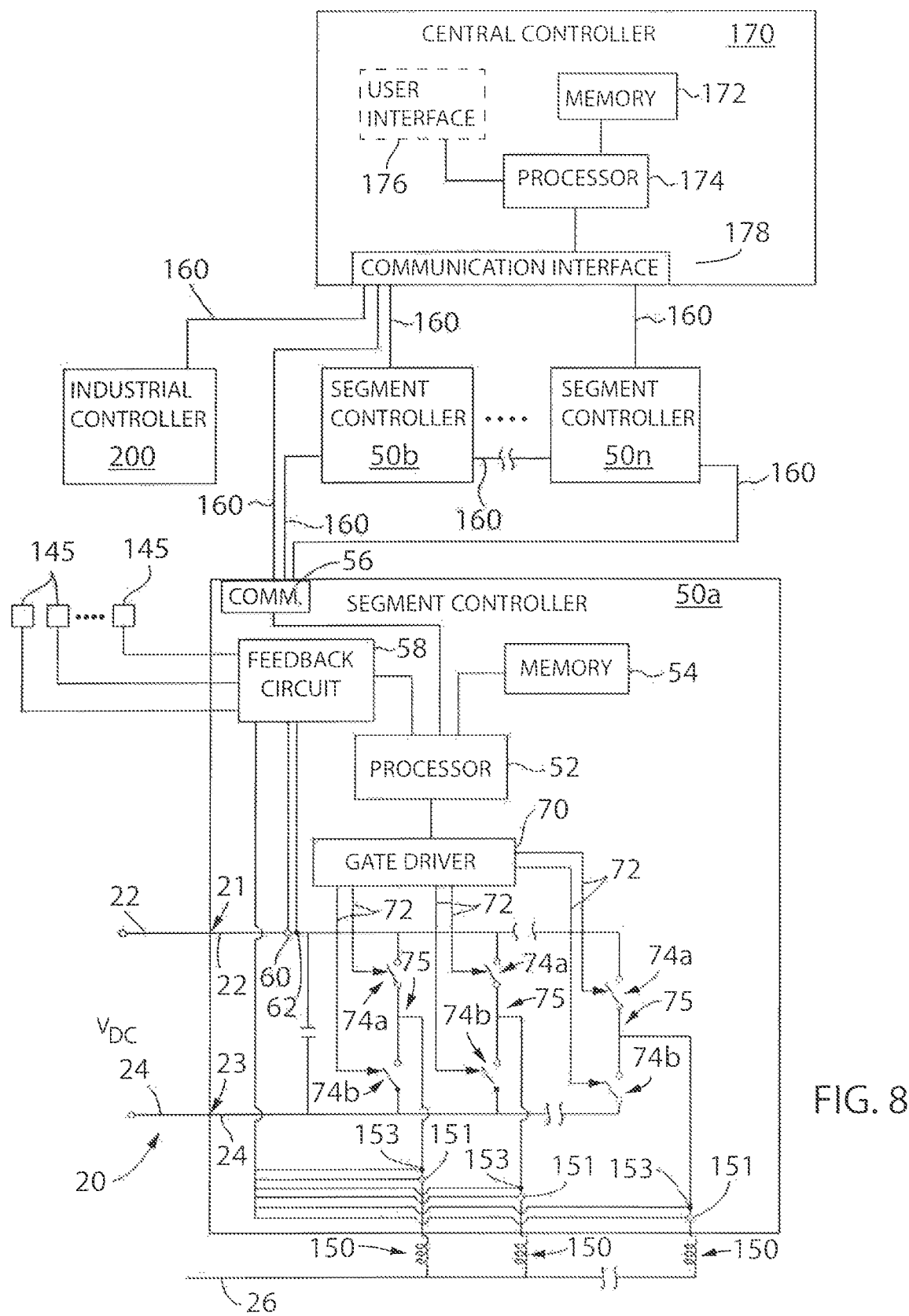
FIG. 8 is a block diagram representation of the exemplary control system of FIG. 1.

With reference also to FIG. 8, the central controller 170 includes a processor 174 and a memory device 172. It is contemplated that the processor 174 and memory device 172 may each be a single electronic device or formed from multiple devices. The processor 174 may be a microprocessor. Optionally, the processor 174 and/or the memory device 172 may be integrated on a field programmable gate array (FPGA) or an application specific integrated circuit (ASIC). The memory device 172 may include volatile memory, non-volatile memory, or a combination thereof. An optional user interface 176 may be provided for an operator to configure the central controller 170 and to load or configure desired motion profiles for the movers 100 on the central controller 170. Optionally, the configuration may be performed via a remote device connected via a network and a communication interface 178 to the central controller 170. It is contemplated that the system controller 170 and user interface 176 may be a single device, such as a laptop, notebook, tablet or other mobile computing device. Optionally, the user interface 176 may include one or more separate devices such as a keyboard, mouse, display, touchscreen, interface port, removable storage medium or medium reader and the like for receiving information from and displaying information to a user. Optionally, the system controller 170 and user interface may be an industrial computer mounted within a control cabinet and configured to withstand harsh operating environments. It is contemplated that still other combinations of computing devices and peripherals as would be understood in the art may be utilized or incorporated into the system controller 170 and user interface 176 without deviating from the scope of the invention.

The central controller 170 includes one or more programs stored in the memory device 172 for execution by the processor 174. The system controller 170 receives a desired position from the industrial controller 180 and determines one or more motion profiles for the movers 100 to follow along the track 10. A program executing on the processor 174 is in communication with each segment controller 50 on each track segment via a network medium 160. The system controller 170 may transfer a desired motion profile to each segment controller 50. Optionally, the system controller 170 may be configured to transfer the information from the industrial controller 180 identifying one or more desired movers 100 to be positioned at or moved along the track segment 12, and the segment controller 50 may determine the appropriate motion profile for each mover 100.

A position feedback system provides knowledge of the location of each mover 100 along the length of the track segment 12 to the segment controller 50. According to one embodiment of the invention, illustrated in FIGS. 2 and 4, the position feedback system includes one or more position magnets 140 mounted to the mover 100 and an array of sensors 145 spaced along the side wall 13 of the track segment 12. The sensors 145 are positioned such that each of the position magnets 140 are proximate to the sensor as the mover 100 passes each sensor 145. The sensors 145 are a suitable magnetic field detector including, for example, a Hall Effect sensor, a magneto-diode, an anisotropic magnetoresistive (AMR) device, a giant magnetoresistive (GMR) device, a tunnel magnetoresistance (TMR) device, fluxgate sensor, or other microelectromechanical (MEMS) device configured to generate an electrical signal corresponding to the presence of a magnetic field. The magnetic field sensor 145 outputs a feedback signal provided to the segment controller 50 for the corresponding track segment 12 on which the sensor 145 is mounted. The feedback signal may be an analog signal provided to a feedback circuit 58 which, in turn, provides a signal to the processor 52 corresponding to the magnet 140 passing the sensor 145.

Figure 6:
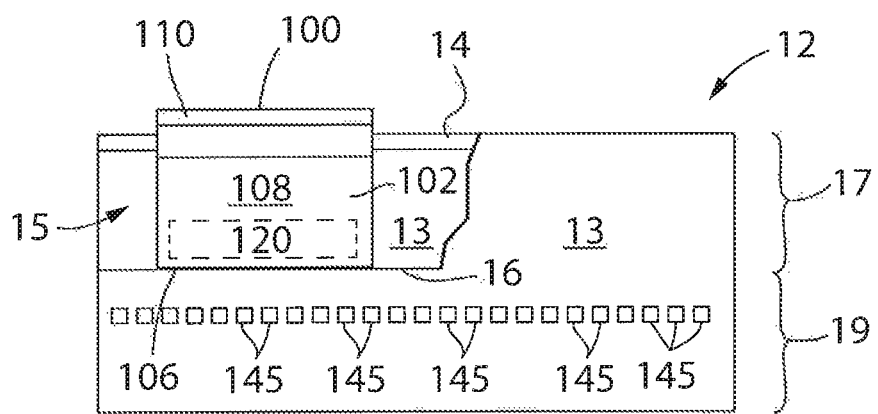
FIG. 6 is a partial side cutaway view of the mover and track segment of FIG. 5.
Figure 7:
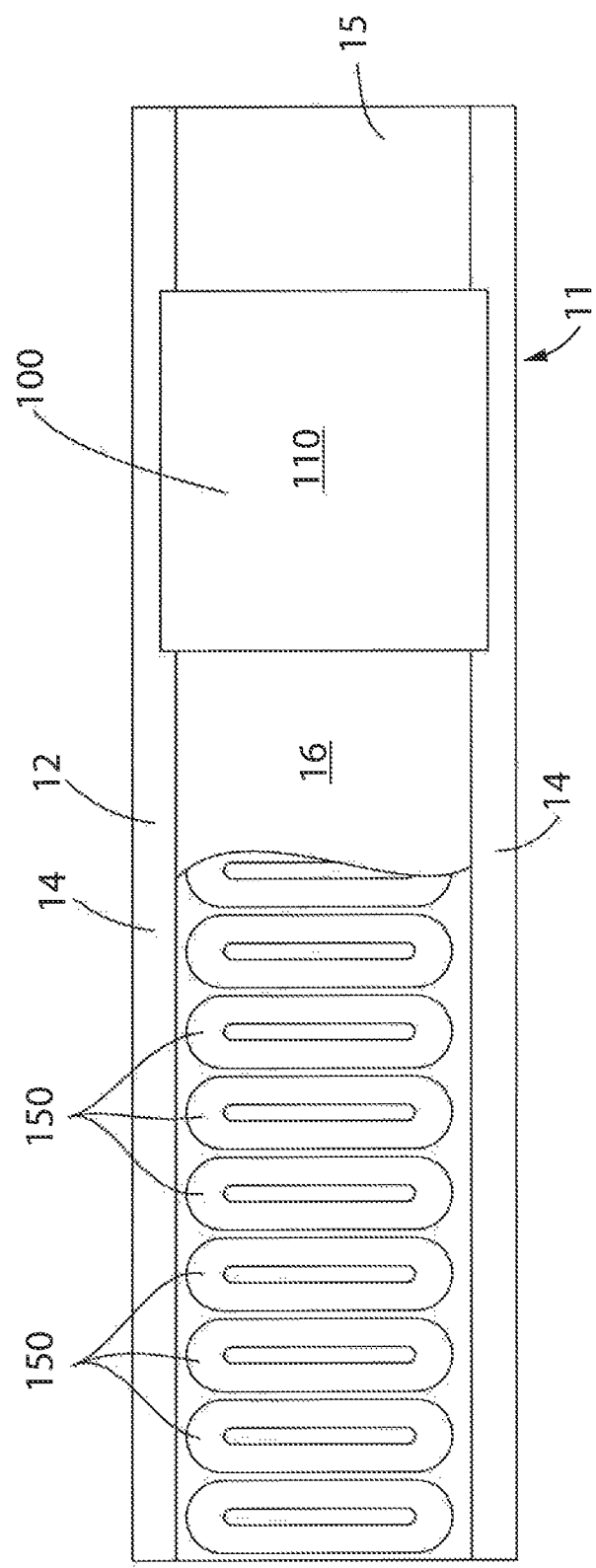
FIG. 7 is a partial top cutaway view of the mover and track segment of FIG. 2.

According to another embodiment of the invention, illustrated in FIGS. 5 and 6, the position feedback system utilizes the drive magnets 120 as position magnets. Position sensors 145 are positioned along the track segment 12 at a location suitable to detect the magnetic field generated by the drive magnets 120. According to the illustrated embodiment, the position sensors 145 are located below the coils 150. Optionally, the position sensors 145 may be interspersed with the coils 150 and located, for example, in the center of a coil or between adjacent coils. According to still another embodiment, the position sensors 145 may be positioned within the upper portion 17 of the track segment 12 and near the bottom surface 16 of the channel 15 to be aligned with the drive magnets 120 as each mover 100 travels along the tracks segment 12.

The segment controller 50 also includes a communication interface 56 that receives communications from the central controller 170 and/or from adjacent segment controllers 50. The communication interface 56 extracts data from the message packets on the industrial network and passes the data to a processor 52 executing in the segment controller 50. The processor may be a microprocessor. Optionally, the processor 52 and/or a memory device 54 within the segment controller 50 may be integrated on a field programmable gate array (FPGA) or an application specific integrated circuit (ASIC). It is contemplated that the processor 52 and memory device 54 may each be a single electronic device or formed from multiple devices. The memory device 54 may include volatile memory, non-volatile memory, or a combination thereof. The segment controller 50 receives the motion profile or desired motion of the movers 100 and utilizes the motion commands to control movers 100 along the track segment 12 controlled by that system controller 30.

Each segment controller 50 generates switching signals to generate a desired current and/or voltage at each coil 150 in the track segment 12 to achieve the desired motion of the movers 100. The switching signals 72 control operation of switching devices 74 for the segment controller 50. According to the illustrated embodiment, the segment controller 50 includes a dedicated gate driver module 70 which receives command signals from the processor 52, such as a desired voltage and/or current to be generated in each coil 150, and generates the switching signals 72. Optionally, the processor 52 may incorporate the functions of the gate driver module 70 and directly generate the switching signals 72. The switching devices 74 may be a solid-state device that is activated by the switching signal, including, but not limited to, transistors, thyristors, or silicon-controlled rectifiers.

According to the illustrated embodiment, the track receives power from a distributed DC voltage. A DC bus 20 receives a DC voltage, $V_{DC}$, from a DC supply and conducts the DC voltage to each track segment 12. The illustrated DC bus 20 includes two voltage rails 22, 24 across which the DC voltage is present. The DC supply may include, for example, a rectifier front end configured to receive a single or multi phase AC voltage at an input and to convert the AC voltage to the DC voltage. It is contemplated that the rectifier section may be passive, including a diode bridge or, active, including, for example, transistors, thyristors, silicon-controlled rectifiers, or other controlled solid-state devices. Although illustrated external to the track segment 12, it is contemplated that the DC bus 20 would extend within the lower portion 19 of the track segment. Each track segment 12 includes connectors to which either the DC supply or another track segment may be connected such that the DC bus 20 may extend for the length of the track 10. Optionally, each track segment 12 may be configured to include a rectifier section (not shown) and receive an AC voltage input. The rectifier section in each track segment 12 may convert the AC voltage to a DC voltage utilized by the corresponding track segment.

The DC voltage from the DC bus 20 is provided at the input terminals 21, 23 to a power section for the segment controller. A first voltage potential is present at the first input terminal 21 and a second voltage potential is present at the second input terminal 23. The DC bus extends into the power section defining a positive rail 22 and a negative rail 24 within the segment controller. The terms positive and negative are used for reference herein and are not meant to be limiting. It is contemplated that the polarity of the DC voltage present between the input terminals 21, 23 may be negative, such that the potential on the negative rail 24 is greater than the potential on the positive rail 22. Each of the voltage rails 22, 24 are configured to conduct a DC voltage having a desired potential, according to application requirements. According to one embodiment of the invention, the positive rail 22 may have a DC voltage at a positive potential and the negative rail 24 may have a DC voltage at ground potential. Optionally, the positive rail 22 may have a DC voltage at ground potential and the negative rail 24 may have a DC voltage at a negative potential According to still another embodiment of the invention, the positive rail 22 may have a first DC voltage at a positive potential with respect to the ground potential and the negative rail 24 may have a second DC voltage at a negative potential with respect to the ground potential. The resulting DC voltage potential between the two rails 22, 24 is the difference between the potential present on the positive rail 22 and the negative rail 24.

It is further contemplated that the DC supply may include a third voltage rail 26 having a third voltage potential. According to one embodiment of the invention, the positive rail 22 has a positive voltage potential with respect to ground, the negative rail 24 has a negative voltage potential with respect to ground, and the third voltage rail 26 is maintained at a ground potential. Optionally, the negative voltage rail 24 may be at a ground potential, the positive voltage rail 22 may be at a first positive voltage potential with respect to ground, and the third voltage rail 26 may be at a second positive voltage potential with respect to ground, where the second positive voltage potential is approximately one half the magnitude of the first positive voltage potential. With such a split voltage DC bus, two of the switching devices 74 may be used in pairs to control operation of one coil 150 by alternately provide positive or negative voltages to one the coils 150.

The power section in each segment controller 50 may include multiple legs, where each leg is connected in parallel between the positive rail 22 and the negative rail 24. According to the illustrated embodiment, three legs are shown. However, the number of legs may vary and will correspond to the number of coils 150 extending along the track segment 12. Each leg includes a first switching device 74a and a second switching device 74b connected in series between the positive rail 22 and the negative rail 24 with a common connection 75 between the first and second switching devices 74a, 74b. The first switching device 74a in each leg 221 may also be referred to herein as an upper switch, and the second switching device 74b in each leg 221 may also be referred to herein as a lower switch. The terms upper and lower are relational only with respect to the schematic representation and are not intended to denote any particular physical relationship between the first and second switching devices 74a, 74b. The switching devices 74 include, for example, power semiconductor devices such as transistors, thyristors, and silicon controlled rectifiers, which receive the switching signals 72 to turn on and/or off. Each of switching devices may further include a diode connected in a reverse parallel manner between the common connection 75 and either the positive or negative rail 22, 24.

The processor 52 also receives feedback signals from sensors providing an indication of the operating conditions within the power segment or of the operating conditions of a coil 150 connected to the power segment. According to the illustrated embodiment, the power segment includes a voltage sensor 62 and a current sensor 60 at the input of the power segment. The voltage sensor 62 generates a voltage feedback signal and the current sensor 60 generates a current feedback signal, where each feedback signal corresponds to the operating conditions on the positive rail 22. The segment controller 50 also receives feedback signals corresponding to the operation of coils 150 connected to the power segment. A voltage sensor 153 and a current sensor 151 are connected in series with the coils 150 at each output of the power section. The voltage sensor 153 generates a voltage feedback signal and the current sensor 151 generates a current feedback signal, where each feedback signal corresponds to the operating condition of the corresponding coil 150. The processor 52 executes a program stored on the memory device 54 to regulate the current and/or voltage supplied to each coil and the processor 52 and/or gate driver module 70 generates switching signals 72 which selectively enable/disable each of the switching devices 74 to achieve the desired current and/or voltage in each coil 150. The energized coils 150 create an electromagnetic field that interacts with the drive magnets 120 on each mover 100 to control motion of the movers 100 along the track segment 12.

In operation, the load may vary on a mover 100 as the mover travels along the track. As previously discussed, the mover 100 includes a platform 110 secured to the top surface 104 of the body 102 of the mover 100. It is contemplated that platforms or attachments of various shapes may be secured to the top surface 104 of the body 102. Further, various workpieces, clips, fixtures, and the like may be mounted on the top of each platform 110 for engagement with a product to be carried along the track by the mover 100. The platform 110 and any workpiece, clip, fixture, or other attachment present on the platform may define, at least in part, a load present on the mover 100. For a given system, each mover 100 may have the same platform and/or attachments to uniformly interact with identical product being loaded on and off the mover 100. The product may constitute an additional load and may vary at different locations along a track. For example, a mover 100 may initially have no additional load present. At a first station, a container, such as a box, bottle, or the like may be loaded on to the mover 100. At a second station, product may be partially or fully loaded into the container. At additional stations, steps, such as additional loading, closing, labeling, and the like may be taken that further alter the load present on each mover. At a final station, the load may be removed and the mover 100 returns to the initial station. According to the exemplary application, the load varies along each section of track after additional packaging and/or product is placed on the mover 100. In addition, wear or damage on contacting surfaces, bearings, and the like may cause variations in the loading between movers 100 or variations in loading for a single mover over time.

In order to optimize performance of the linear drive system, it is desirable to characterize loads present on the movers 100 at various locations along the track. According to one embodiment of the present invention, the segment controller 50 may be configured to provide a characterization of a load present on each mover 100 as it travels along the corresponding track segment 12. The mover 100 is initially positioned at a point of interest along a track segment 12. The expected load to be present on the mover 100 may also be included on the mover. For example, if a container and/or product is present on the mover 100 during operation, an appropriate container and/or product may be loaded on the mover 100 prior to characterization. As will be discussed in more detail below, the segment controller 50 then executes a characterization module to obtain a frequency response corresponding to performance of a mover 100 at a location and with an expected load. Optionally, the segment controller 50 may sample data and transmit stored data to the central controller 170 or to another remote processing device to obtain the frequency response corresponding to performance of the mover 100 at a location and with an expected load.

Figure 9:
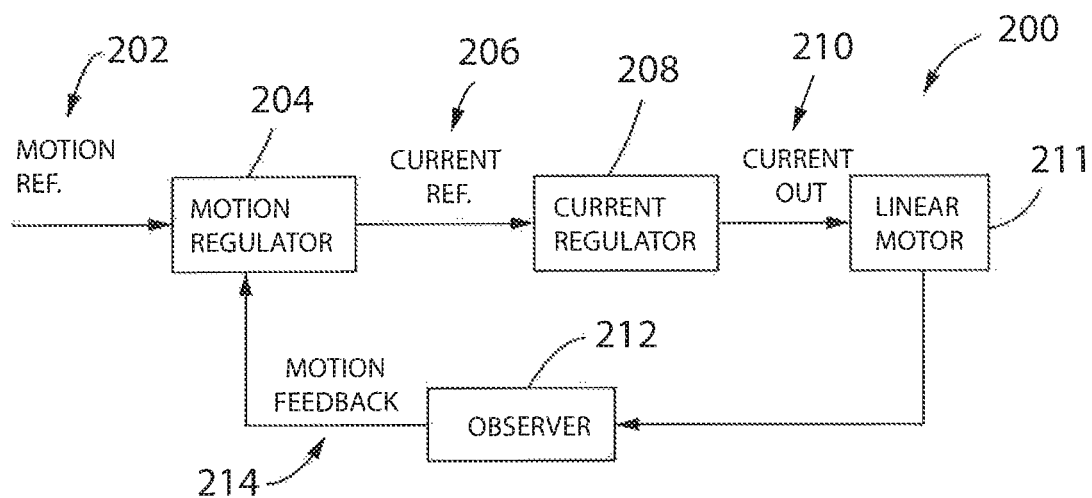
FIG. 9 is a block diagram representation of an exemplary control system for a segment controller in the linear drive system of FIG. 1.

With reference next to FIG. 9, a block diagram of an exemplary control module 200 executing on the processor 52 of a segment controller 50 is illustrated. The exemplary control module 200 receives a motion reference 202. The motion reference may be a position command or a velocity command corresponding to a desired location or speed of the mover 100. A motion regulator 204 executes on the segment controller 50 to control each mover 100 to the desired position or at the desired speed according to the motion reference 202. The motion regulator 204 includes a controller with a Proportional (P) control path, an Integral (I)

control path, a Derivative (D) control path, or any combination thereof. In addition, the motion regulator 204 may further include additional feedforward, or feedback paths according to the control requirements. A motion feedback signal 214 corresponding to the actual position or velocity of the mover 100 is provided to the motion regulator 204. The motion regulator 204 compares the motion feedback signal 214 to the motion reference signal 202 and executes the control path(s) present in the regulator to generate a current reference signal 206.

The current reference signal 206 is provides as an input to a current regulator 208. The current regulator 206 executes on the segment controller 50 to control the amount of current output to each coil 150, which in turn, interacts with the drive magnets 120 on each mover 100 to locate each mover 100 at the desired position or propel the mover 100 at the desired speed according to the motion reference 202. The current regulator 206 includes a controller with a Proportional (P) control path, an Integral (I) control path, a Derivative (D) control path, or any combination thereof. In addition, the current regulator 206 may further include additional feedforward, or feedback paths according to the control requirements. A current feedback signal is generated by each current sensor 153 corresponding to the actual output current 210 supplied to a coil 150. The current regulator 206 compares the current feedback signal to the current reference signal 206 and executes the control path(s) present in the regulator and, in tandem with the gate driver 70, generates the switching signals 72 to produce the output current 210 for each coil 150.

The linear motor 211 includes both the drive coils 150 extending along each track segment 12 and the drive magnets 120 present on each mover 100. The current output 210 from the segment controller 50 generates an electromagnetic field from each coil 150 that interacts with the magnetic field generated by the drive magnets 120 such that the movers 100 follow the motion reference signal 202.

According to the illustrated embodiment, the control module 200 also includes an observer 212 that generates an estimated motion feedback signal 214. The estimated motion feedback signal may be an estimated position signal or an estimated velocity signal such that the motion feedback signal 214 corresponds to the motion reference signal 202. The observer 212 may receive, for example, any of the signals in the control module including the motion reference 202, the current reference 206, the current output 210, an output voltage, or a combination thereof. An observer 212 generates an estimated feedback signal as a function of the reference signals and of the expected dynamics of the mover 100.

According to still another embodiment, the motion feedback signal 214 may be generated as a function of a measured feedback signal. The motion feedback signal may correspond, for example, to a signal from a position sensor 145 detecting either a position magnet 140 or a drive magnet 120 passing the position sensor 145. In still other embodiments, the motion feedback signal 214 may be determined as a function of both measured and commanded signals.

Figure 10:
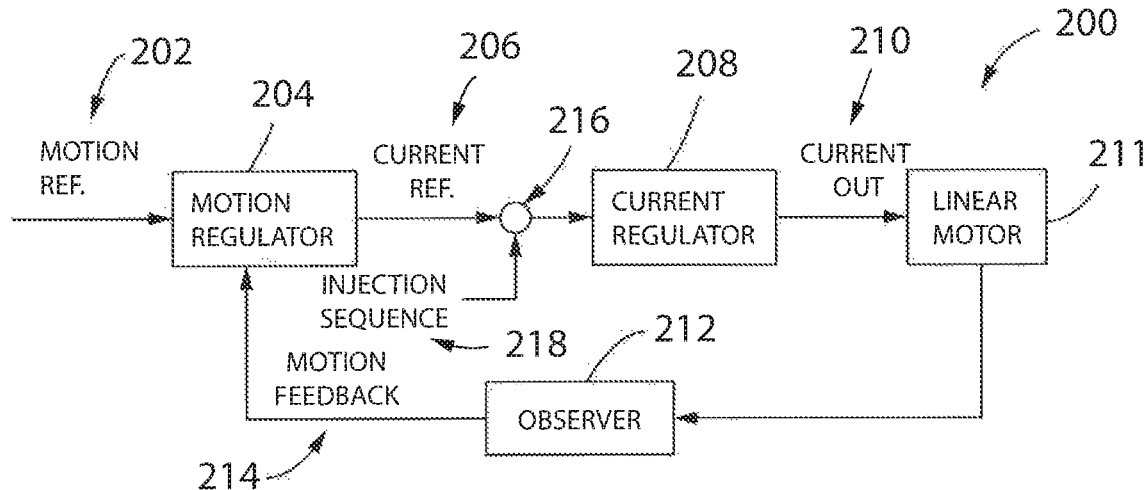
FIG. 10 is a block diagram representation of the exemplary control system of FIG. 9 with an injection sequence illustrated as being added at the current reference.
Figure 11:
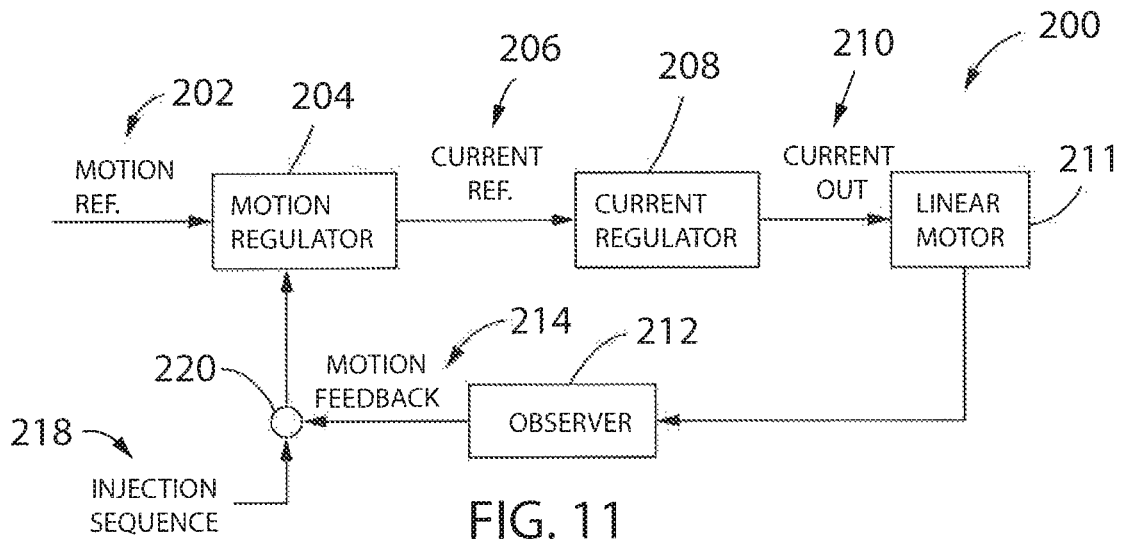
FIG. 11 is a block diagram representation of the exemplary control system of FIG. 9 with an injection sequence illustrated as being added at the motion feedback.

Turning next to FIGS. 10 and 11, the segment controller 50 may be configured to insert an injection sequence 218 into the control module 200. According to the embodiment illustrated in FIG. 10, an injection sequence 218 is added at a summing junction 216 to the current reference signal 206 before providing the resulting signal to the current regulator 208. According to the embodiment illustrated in FIG. 11, an injection sequence 218 is added at a summing junction 220 to the motion feedback signal 214 before providing the resulting signal to the motion regulator 204. In either instance, the injection sequence is a pseudorandom binary sequence (PRBS). The sequence is selected such that it exhibits the behavior of a random sequence; however, the sequence is generated in a deterministic manner to ensure that the content of the sequence has harmonic content across a desired range of frequencies for evaluation.

Figure 12:
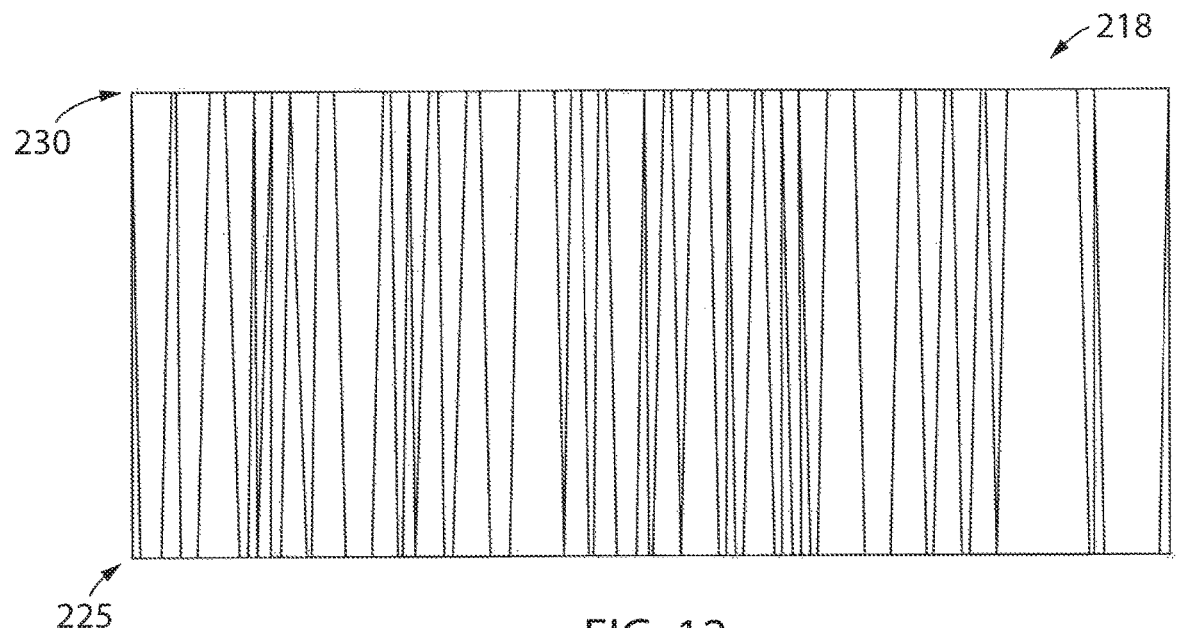
FIG. 12 is a graphical representation of one embodiment of an injection sequence.

With reference also to FIG. 12, an exemplary segment 218 of a PRBS is illustrated. The PRBS includes a sequence of bits which are either a logical zero 225 or a logical one 230. As seen in FIG. 12, the exemplary segment 218 of the PRBS transitions between either a logical zero 225 or a logical one 230 at varying time intervals. The PRBS has a fixed length, but exhibits randomness in the sense that there is no correlation between any one value of the sequence and another value of the sequence. The PRBS may be generated by the processor 52 executing a pseudorandom sequence generator routine from which the series of zeros 225 and ones 230 are output. The PRBS may be stored in the memory device 54 for subsequent usage or, alternately, a new PRBS may be generated each time a characterization process is executed.

Figure 13:
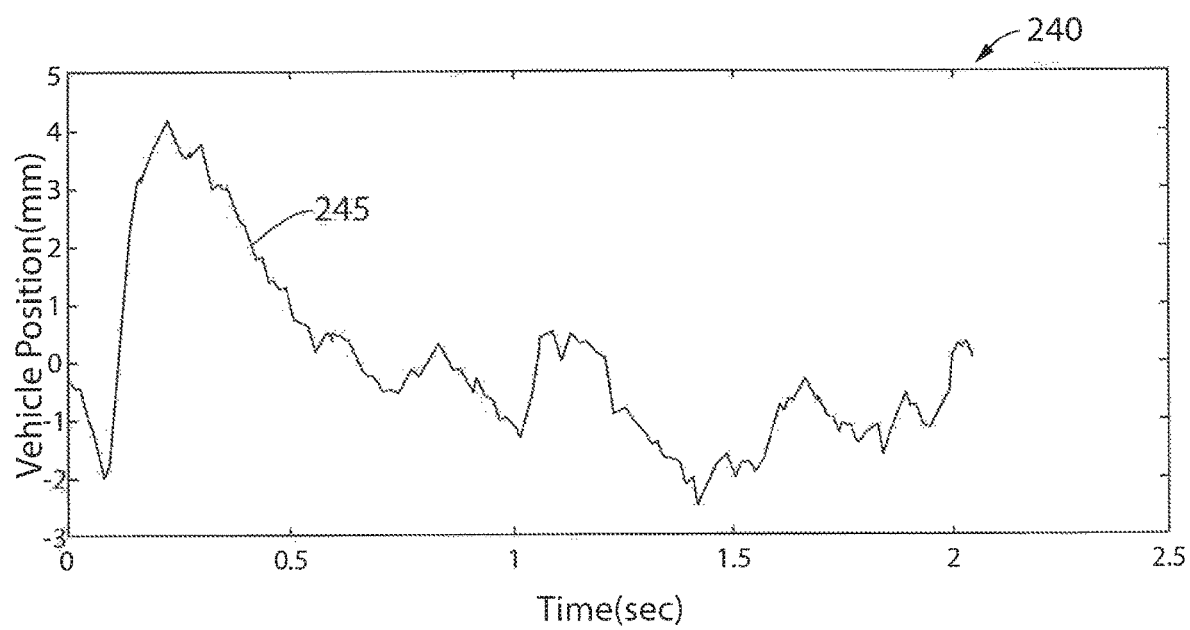
FIG. 13 is a graphical representation of an exemplary position feedback signal illustrating motion of a mover in response to an injection sequence.

In order to characterize a particular load on a mover 100, the mover 100 is first positioned at a desired location with a desired load applied. A zero motion reference signal is then applied to the control module 200 such that the control module attempts to hold the mover 100 at the selected location. Addition of the injection sequence 218 either to the current reference 206 or to the motion feedback signal 214 appears as a disturbance to the control module 200. In other words, the control module 200 interprets the injection signal as either motion on the mover 100 or an extra current required to hold the mover 100 at its present location. The motion regulator 204 and/or the current regulator 208 attempt to compensate for the injection sequence 218. As a result of the compensation, a small amount of movement occurs on the mover 100. With reference, for example, to FIG. 13, a plot 240 of a mover position signal 245 corresponding to the actual position of a mover 100 with respect to the original position (i.e., zero (0) mm) during application of the injection sequence is illustrated.

While the injection sequence 218 is being added to the control module 200, the segment controller 50 stores samples of the injection sequence 218 and the position signal 245 resulting from the addition of the injection sequence in memory 54. The injection sequence 218 serves as an input signal to the control module 200 and the position signal 245 is a response signal from the control module 200. It is contemplated that various other signals with the control module 200 may be sampled, such as the current reference 206 or current output 210 to obtain a response signal of the control module 200 resulting from the addition of the injection sequence 218. The injection sequence 218 is applied for a predefined duration and a number of samples for both the input signal and the response signal are stored in order to obtain a frequency response of the control module 200 across a desired range of frequencies.

After sampling the input and response signals, a frequency response of the stored data is obtained. The frequency response is an analysis of a signal which determines a magnitude and phase of the signal as a function of frequency. In order to determine the frequency response of a signal, a continuous function defining the signal may be determined and a Fourier transform of the continuous function is performed. The Fourier transform expresses the function as a function of frequencies over an infinite frequency interval. However, determining the Fourier transform of a continuous function is computationally intensive.

In order to reduce the computation requirements for the frequency analysis of the signal to a suitable level for real-time control, the signal is sampled over a defined sample interval at a sampling frequency and the sampled data is stored in memory. This sampled data may be, for example, the injection sequence and the sampled position feedback signal.

Figure 14:
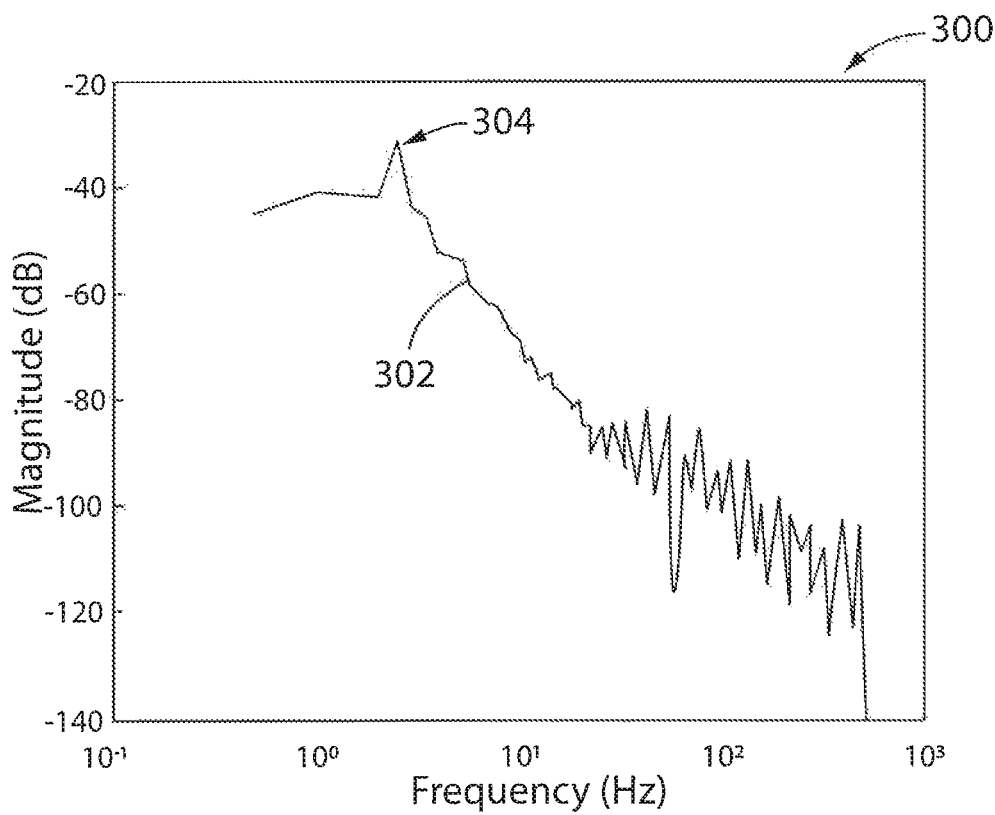
FIG. 14 is a graphical representation of an exemplary frequency response determined for a mover used to characterize operation of the mover.
Figure 15:
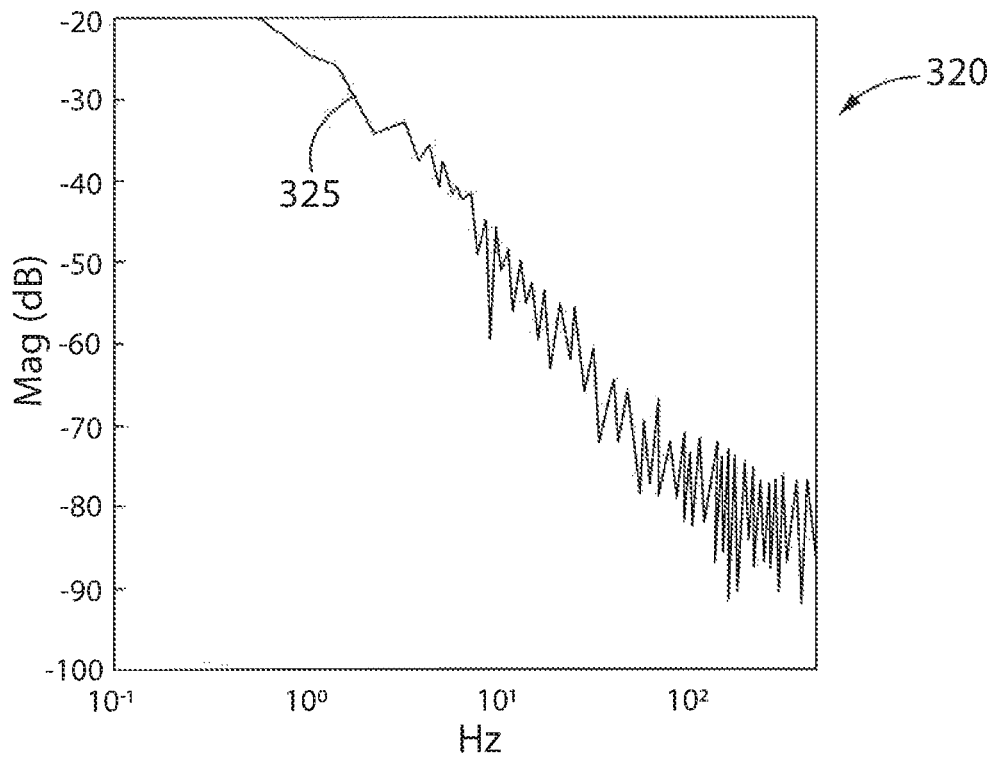
FIG. 15 is another graphical representation of an exemplary frequency response determined for a mover used to characterize operation of the mover.

Traditionally, a Discrete Fourier Transform (DFT) is performed on the sampled data to express the stored signal as a discrete set of complex vectors having magnitude and phase information of the signal over a finite frequency interval. A common DFT algorithm is given in Equation 1 below. However, it is contemplated that other DFT algorithms or Fast Fourier Transform (FFT) algorithms may be utilized without deviating from the scope of the invention.

$$X(k) = \sum_{n=1}^{N} x(n) e^{-j2\pi(k-1)(n-1)/N} \qquad (1)$$

where:
X(k)=vector having a magnitude and phase information for "K" evenly spaced frequency bins
N=maximum number of samples
n=sample number
x(n)=array of sampled data
k=an integral index value selected from the range of 1 to K
K=number of evenly spaced frequency bins between zero hertz and the sampling frequency and typically equal to one half of the maximum number of samples Having obtained the magnitude and phase information of the sampled data, a Bode plot may be generated to characterize the frequency response of a mover 100 resulting from addition of the injection sequence 218. The Bode plot provides magnitude and phase information of a transfer function describing the system as a function of the input and output signals. The magnitude of the transfer function may be determined by dividing the magnitude of the frequency response for the output signal by the magnitude of the frequency response for the input signal at each frequency. The phase of the transfer function may be determined by subtracting the phase of the input signal from the phase of the output signal at each frequency. Exemplary plots of the magnitude components of a Bode plot are shown in FIGS. 14-16.

Analysis of the frequency response may be performed to identify the frequency component or components having the greatest magnitude information, or the maximum value. In an unstable system, this maximum value typically corresponds to a resonant, or anti-resonant, frequency. With reference, for example, to FIG. 14, the Bode plot 300 includes a magnitude plot 302 for a single mover that exhibits a small resonant peak 304 at about 1.5 Hz. In some embodiments, the frequency response may be transmitted from the segment controller to the central controller or to a remote processing unit. Optionally, the frequency response may be determined directly on the central controller or the remote processing unit. At the central controller or remote processing unit, the frequency response may be displayed on a visual display to provide a graphical representation of the frequency response to an operator.

Analysis of the frequency response may further be performed to compare the frequency response for one mover to the frequency response for another mover. Optionally, a nominal frequency response plot 325, such as that illustrated in the Bode plot 320 of FIG. 15 may be stored in memory 54 of the segment controller 50. The nominal frequency response plot 325 may be obtained, for example, by a commissioning routine in which a known mover 100 is positioned at a predefined location that exhibits a desired operating characteristic. In general, as the value of the magnitude increases at a particular frequency, the harmonic content present in the response signal for that frequency is increasing as well. Thus, a lower magnitude indicates less harmonic content present in the response signal. The desired operating characteristic may be, therefore, a frequency response with a set of maximum values for the magnitude of frequency content present at the different frequencies. According to another aspect of the invention, the desired operating characteristic may be a mover operating under a known condition, such that subsequent comparisons to other movers or at other locations along the track may be made to a known operating condition.

Figure 16:
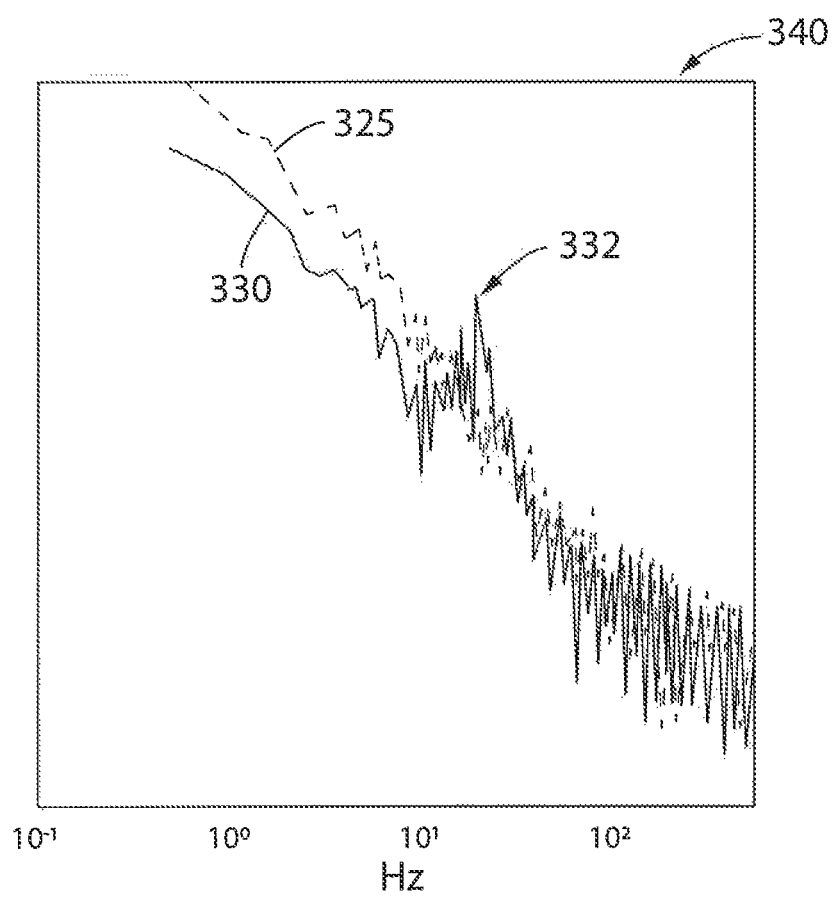
FIG. 16 is a comparison of two graphical representations of exemplary frequency responses determined for two separate movers used to characterize operation of each of the movers.

Turning next to FIG. 16, a comparison of the frequency responses 325, 330 for two movers 100 or for one mover at two different locations may be used to identify an undesirable operating condition. The nominal frequency response plot 325 from FIG. 15 is included in the Bode plot 340 illustrated in FIG. 16. A second frequency response plot 330 is illustrated as well. As may be observed from the plot 340 in FIG. 16, the second frequency response plot 330 has a generally lower magnitude than the nominal frequency response plot 325. The lower magnitude may be due, for example, to increased loading of the mover 100 or an increased friction between the mover 100 and the track at a second location. The increased weight or increase friction may, generally result in more damping of harmonic components in the mover 100. However, the second frequency response plot 330 also exhibits a resonant operating point 332 at about 20 Hertz. The resonant operating point 332 may be caused by an instability introduced by the load or by the increased friction at the second location.

Having identified the resonant operating point 332, the segment controller 50 may be configured to compensate for the resonant operating point 332. According to one embodiment of the invention, the segment controller 50 may, for example, be configured to execute with a different set of controller gains to reduce the effects of the resonant operating point 332. During a commissioning run, a central controller may command a mover 100 to travel the entire length of the track 10. Along each track segment 12, each segment controller 50 may be configured to execute the characterization module to obtain one or more frequency responses of the mover 100 along the track segment 12. Further, it is contemplated that the characterization module may utilize multiple sets of controller gains with a mover 100 and a given load to obtain different frequency responses for each set of controller gains. The segment controller 50 identifies one of the frequency responses as providing the best response according, for example, to a comparison of gain margin and/or phase margin of each response or to the bandwidth of each response. The different sets of controller gains may be stored in memory 54 of the segment controller.

During operation, the segment controller 50 may be configured to select a set of controller gains according to the best response identified during the commissioning run. In addition, if different movers 100 or movers 100 having different loads are to travel along a track segment, multiple commissioning runs may be executed with each mover and/or the varying loads. A table may be established that identifies different movers anal/or different loads present on the mover and the corresponding set of controller gains that provide the preferred frequency response. As a mover 100 reaches a track segment, the segment controller may utilize the corresponding set of controller gains for each mover and/or load present on the mover according to the table established during the commissioning run. It is further contemplated that the table may identify more than one set of controller gains for a mover 100 along a single track segment if, for example, the load changes as the mover 100 travels along the track segment 12. The segment controller 50 may be further configured to select a first set of controller gains along a first portion of the track segment and a second set of controller gains along a second portion of the track segment.

It is further known that contacting surfaces between the mover 100 and the track segment 12 may wear over time. During an initial commissioning run, a track segment 12 may execute the characterization module to obtain one or more initial frequency responses of the mover 100 along the track segment 12. Each of the initial frequency responses obtained may be stored in memory 54 of the segment controller 50. At periodic intervals, the system may be commanded to execute subsequent characterization of the track segment. The interval may be set according to a maintenance schedule based, for example, on time or operation or on number of movers traveling across each location to obtain new frequency responses. The new frequency responses may be compared to the initial frequency responses to identify changes in operating conditions for a mover and/or a track segment. If a difference between a new frequency response and an initial frequency response exceeds a predefined threshold, a warning message may be posted alerting an operator to required maintenance.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

I claim:

1. A system for characterizing loads in a linear drive system, comprising:
a plurality of movers, wherein each of the plurality of movers includes:
a load mounted to the mover, and
at least one drive magnet mounted to the mover;
a track including a plurality of track segments defining a path along which each of the plurality of movers travels, wherein each of the plurality of track segments includes a plurality of drive coils spaced along the track segment and a memory device,
and
a processor operative to:
execute a control module wherein:
the control module includes a motion regulator and a current regulator,
the motion regulator is configured to receive a reference signal and a modified feedback signal as inputs and to generate a current reference as an output,
the current regulator is configured to receive the current reference as an input, and
the current reference defines a desired output current for each of the plurality of drive coils to obtain a desired motion of each of the plurality of movers along the track segment,
generate an injection sequence having a plurality of harmonic components,
receive at least one position feedback signal corresponding to a location of one of the plurality of movers along the track segment;
store a plurality of samples of the at least one position feedback signal in the memory device;
add the injection sequence to the at least one position feedback signal to create the modified feedback signal;
provide the modified feedback signal to the motion regulator while commanding each of the plurality of movers to remain stationary along the track segment, and
generate a frequency response of each mover positioned along the track segment.

2. The system of claim 1 wherein the load is fixedly mounted to the mover and the frequency response corresponds to operation of the mover.

3. The system of claim 1 wherein:
the load is removably mounted to the mover,
the processor is further operative to generate a first frequency response and a second frequency response,
the first frequency response is generated with the load mounted to the mover, and
the second frequency response is generated with the load removed from the mover.

4. The system of claim 3 wherein the processor is further configured to identify a resonant operating point in one of the first frequency response and the second frequency response.

5. The system of claim 3 wherein the memory device is further configured to store a set of maximum values for each frequency present in the first and the second frequency responses and wherein the processor is further operative to determine when a magnitude at one of the frequencies present in each of the first and the second frequency responses is greater than the corresponding maximum value.

6. The system of claim 1 wherein at least one of the plurality of movers is moved to a plurality of locations along one of the track segments and the frequency response is generated for the mover at each of the plurality of locations.

7. The system of claim 6 wherein the processor is further operative to evaluate the frequency response at each of the plurality of locations to identify a resonant operating point in at least one of the frequency responses.

8. The system of claim 6 wherein a nominal frequency response for the mover is stored in the memory device and wherein the processor is further operative to:
compare the frequency response obtained at each of the plurality of locations to the nominal frequency response, and
identify at least one location as having a fault when a difference between the frequency response obtained at each of the plurality of locations exceeds a predetermined threshold from the nominal frequency response.

9. The system of claim 1 further comprising a segment controller in each of the plurality of track segments wherein the processor is included in each segment controller.

10. The system of claim 1 further comprising:
a segment controller having a local processor; and
a central controller having a remote processor, wherein at least a first portion of the steps the processor is operative to perform are performed on the local processor and at least a second portion of the steps the processor is operative to perform are performed on the remote processor.

11. The system of claim 1 further comprising a visual display unit wherein the frequency response is graphically represented on the visual display unit.

12. The system of claim 1 wherein the processor is further operative to store a plurality of samples of the current reference and wherein the plurality of samples of the current reference define an input to the frequency response and the plurality of samples of the at least one position feedback signal define an output of the frequency response.

13. A method for characterizing a load in a linear drive system, wherein the linear drive system includes a plurality of movers operative to travel along a track and wherein the track includes a plurality of track segments, the method comprising the steps of:
   executing a control module in a segment controller, wherein:
      the control module includes a motion regulator and a current regulator,
      the motion regulator is configured to receive a reference signal and a modified feedback signal as inputs and to generate a current reference as an output,
      the current regulator is configured to receive the current reference as an input, and
      the current reference defines a desired output current for each coil spaced along a track segment;
   generating an injection sequence with the segment controller, wherein the injection sequence includes a plurality of harmonic components;
   receiving at least one position feedback signal at the segment controller, wherein each position feedback signal corresponds to a location of one of the plurality of movers along the track segment;
   storing a plurality of samples of the at least one position feedback signal in a memory device in the segment controller;
   adding the injection sequence to the at least one feedback signal to create the modified feedback signal;
   providing the modified feedback signal to the motion regulator while commanding each of the plurality of movers to remain stationary along the track segment; and
   generating a frequency response of each mover positioned along the track segment.

14. The method of claim 13 further comprising the steps of:
   moving at least one of the plurality of movers to a plurality of locations along one of the track segments; and
   generating the frequency response for the mover at each of the plurality of locations.

15. The method of claim 14 further comprising the step of evaluating the frequency response at each of the plurality of locations to identify a resonant operating point in at least one of the frequency responses.

16. The method of claim 14 wherein a nominal frequency response for the mover is stored in the memory device, the method further comprising the steps of:
   comparing the frequency response obtained at each of the plurality of locations to the nominal frequency response, and
   identifying at least one location as having a fault when a difference between the frequency response obtained at each of the plurality of locations exceeds a predetermined threshold from the nominal frequency response.

17. The method of claim 13 wherein the load is fixedly mounted to the mover and the frequency response corresponds to operation of the mover.

18. The method of claim 13 wherein the load is removably mounted to the mover, the method further comprising the steps of:
   generating a first frequency response with the load mounted to the mover, and
   generating a second frequency response with the load removed from the mover.

19. The method of claim 18 further comprising the step of identifying a resonant operating point in one of the first frequency response and the second frequency response.

20. The method of claim 13 further comprising the step of storing a plurality of samples of the current reference in the memory device in the segment controller, wherein the plurality of samples of the current reference define an input to the frequency response and the plurality of samples of the at least one position feedback signal define an output of the frequency response.

* * * * *